United States Patent [19]

Jouin et al.

[11] Patent Number: 5,659,880
[45] Date of Patent: Aug. 19, 1997

[54] ACCELERATED SYNCHRONIZATION METHOD FOR A MOBILE TERMINAL IN A MOBILE RADIO NETWORK

[75] Inventors: Christophe Jouin, Paris; Frédéric Chanu, Montesson, both of France

[73] Assignee: Alcatel Mobile Communications France, Paris, France

[21] Appl. No.: 423,526

[22] Filed: Apr. 17, 1995

[30] Foreign Application Priority Data

Apr. 27, 1994 [FR] France ................... 94 05097

[51] Int. Cl.⁶ .................................. H04B 7/26
[52] U.S. Cl. ......................... 455/502; 455/517
[58] Field of Search ..................... 455/33.1, 33.2, 455/54.1, 54.2, 51.1, 51.2; 375/356; 370/100.1, 503, 510

[56] References Cited

U.S. PATENT DOCUMENTS 5,212,808  5/1993  Su et al. ..................... 455/51.1
5,280,541  1/1994  Marko et al. ................. 455/51.1 X

FOREIGN PATENT DOCUMENTS

0540808A2  5/1993  European Pat. Off. .
0546614A1  6/1993  European Pat. Off. .

OTHER PUBLICATIONS

French Search Report FR 9405097.

*Primary Examiner*—Chi H. Pham
*Attorney, Agent, or Firm*—Sughrue, Mion, Zinn, Macpeak and Seas

[57] ABSTRACT

A method of synchronizing a mobile terminal in a mobile radio network in which synchronization of the mobile terminal takes place only after determination of the best cell by means of a measurement campaign requests synchronization of the mobile terminal in order to communicate with a control station, verifies that a measurement campaign has already been effected and that the time elapsed since that measurement campaign was effected is less than a predetermined validity time interval, and synchronizes the mobile terminal to the control station.

7 Claims, 1 Drawing Sheet

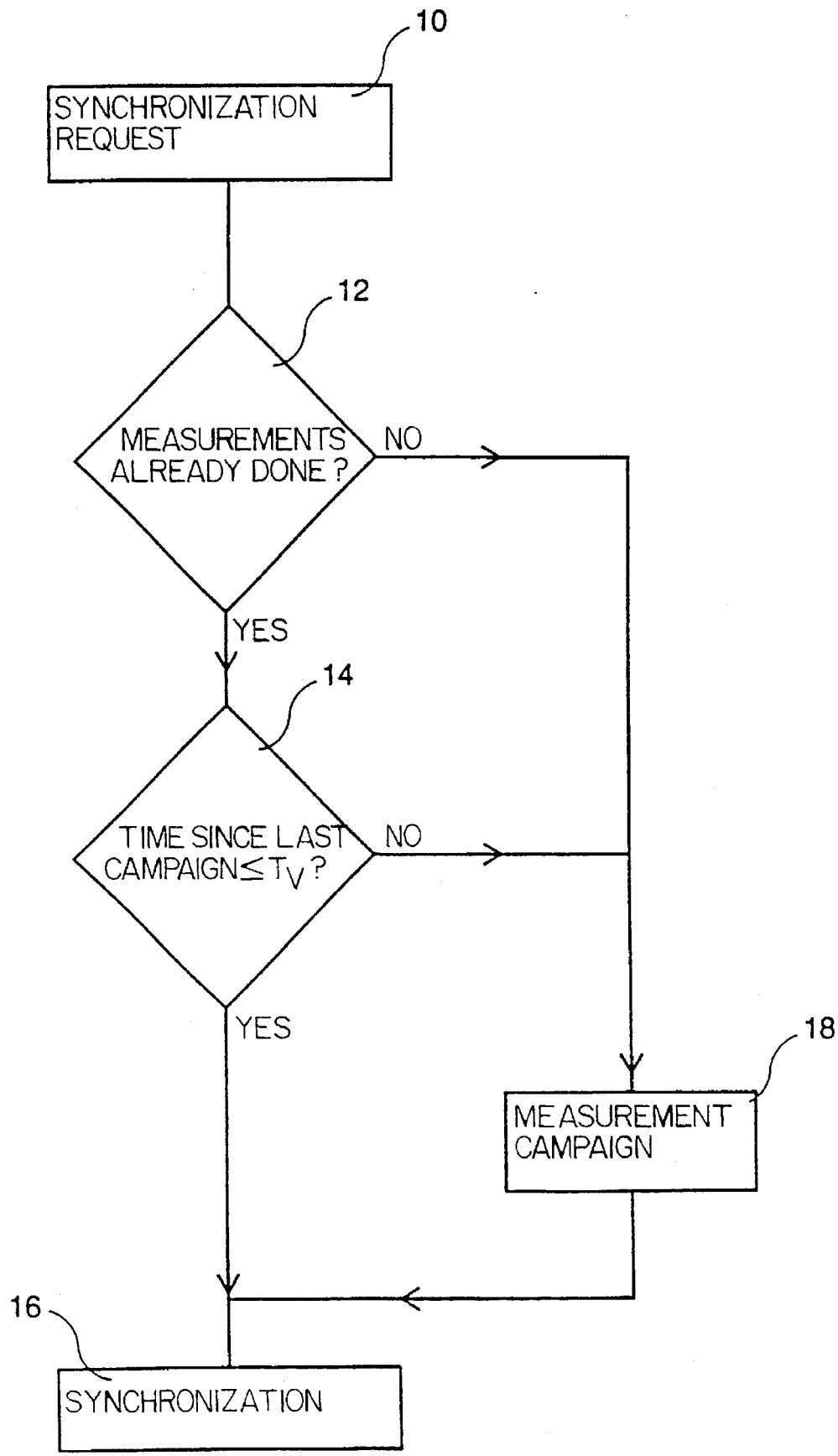

ACCELERATED SYNCHRONIZATION METHOD FOR A MOBILE TERMINAL IN A MOBILE RADIO NETWORK

BACKGROUND OF THE INVENTION

1. Field of the invention

The present invention is generally concerned with synchronizing mobile terminals in a cellular mobile radio network and in particular with a method of accelerating the synchronization of a mobile terminal in a mobile telephone system.

2. Description of the Prior Art

GSM type mobile radio systems are cellular networks in which each cell is the radio coverage area of a base transceiver station (BTS). Each cell can be identified by a mobile terminal from a frequency on which the base transceiver station broadcasts control information to all terminals present in the cell and adjacent cells. In the GSM system the number of frequencies that can be used is 124.

When a terminal wishes to identify itself to the network, it must begin by identifying the cell in which it is located. This is achieved by listening in succession to all the frequencies provided by the system and determining that received at the highest power. This action ("measurement campaign") can take between three seconds and five seconds.

The terminal then attempts to synchronize to the base transceiver station received at the highest power, and if it fails to do so it attempts to synchronize to the other base transceiver stations in decreasing power order until it is able to synchronize to one of them.

The measurement campaign and synchronization procedure is undertaken systematically when the terminal is switched on or when the terminal user requests to change networks. However, it is also started in response to any loss of synchronization, for example if the radio link between the base transceiver station and the terminal is broken because the vehicle in which the terminal is located enters a tunnel, or more generally because the terminal is unable to synchronize because of poor radio reception conditions. Unfortunately, during such synchronization, the terminal is unavailable for the duration of the measurement campaign (between three seconds and five seconds) preceding synchronization proper. Terminal users find that this unavailability time is too long and this leads to user dissatisfaction.

For this reason one object of the invention is to provide a method of synchronizing a mobile terminal which in favorable cases avoids the need for any measurement campaign.

SUMMARY OF THE INVENTION

The invention consists in a method of synchronizing a mobile terminal in a mobile radio network in which synchronization of the mobile terminal takes place only after determination of the best cell by means of a measurement campaign, the method comprising the following steps:
requesting synchronization of the mobile terminal in order to communicate with a control station,
verifying that a measurement campaign has already been effected,
verifying that the time elapsed since the measurement campaign was effected is less than a predetermined validity time interval, and
synchronizing the mobile terminal to the control station.

The aims, objects and features of the present invention will emerge more clearly from the following description of the method of the invention.

DETAILED DESCRIPTION OF THE PREFERRED EMBODIMENT

In the single figure, the synchronization method used by the terminal control software starts with a synchronization request 10. This synchronization request can be automatic on switching on the mobile terminal, consecutive upon a request to change network by the user, or required by the terminal following loss of synchronization due to the vehicle in which the terminal is located travelling through a tunnel, for example.

Then step 12 verifies if a measurement campaign has already been carried out, either for a preceding synchronization or automatically. A measurement campaign is effected in a systematic manner and periodically with a period T whose value depends on the number of frequencies used which depends on the size of the cells, which is different in urban areas and in rural areas. The period T can have a value from five seconds to 60 seconds.

The measurement campaign intended to keep the terminal synchronized to the network by determining continuously the appropriate base transceiver station is effected autonomously and does not make the terminal unavailable.

Then step 14 determines if the time elapsed since the last measurement campaign is less than a time interval $T_V$ estimated as being the period of validity of a measurement campaign allowing for certain parameters including the cell size, for example. This time interval can be fixed or modified by the following algorithm which allows for the mobility of the terminal in the network.

Firstly, the value of the time interval $T_V$ must be such that:

$$T_0 \leq T_V < T$$

where $T_0$ is an arbitrary value which can be fixed at one second or two seconds.

Thus $T_V = T_0 + T_{\alpha n}$
where $T_{\alpha n}$ is calculated as follows:
Considering a predetermined value K, the sum of the six best frequencies is compared to K:

$$\Sigma \frac{|Pn - (Pn-1)|}{T} > K$$

where $P_{n-1}$ represents the power during the next to last measurement campaign and $P_n$ represents the power during the last measurement campaign.

If the condition is satisfied, which means that the variation of the power level is high and that the terminal is moving very quickly, then:

$$T_{\alpha n} = 0$$

Otherwise:

$$T_{\alpha n} = T_{\alpha n-1} + \Delta t$$

where $T_{\alpha 0} = 0$
knowing that $\Delta t$ can be equal to 0.5 second or 1 second.

If the time elapsed since the last measurement campaign is less than $T_V$ there is no further measurement campaign (as would normally be the case), based on the assessment that the preceding measurement campaign is still valid. The synchronization is then carried out (step 16).

If no measurement campaign has been effected (for example on switching on the terminal) or if a time greater than $T_V$ has elapsed since the last measurement campaign, then a measurement campaign is required (step 18) before synchronization can be carried out.

The invention applies outside of measurement campaigns carried out autonomously. Thus it is possible for a synchronization request to occur immediately after the preceding synchronization request or within the time interval $T_V$. In this case the measurement campaign for the preceding synchronization is still valid and no new campaign is needed.

Another application of the invention is to switching on of the terminal. As soon as the terminal is switched on a synchronization procedure including the measurement campaign is started without waiting for the user identification, mainly to allow an emergency call to be made. The user then inserts his identification (SIM) card to identify himself. A new synchronization to the preferred network is then effected. However, as previously, this synchronization is not preceded by a further measurement campaign if the request occurs within a time interval $T_V$ of the first measurement campaign.

The invention avoids the mobile terminal being unavailable for three seconds to five seconds (the duration of a measurement campaign) if the synchronization requests occur at favorable times. In addition to the choice in respect of the determination of the time interval $T_V$ as already mentioned above, other modifications may suggest themselves to the person skilled in the art which do not depart from the scope of the invention.

There is claimed:

1. Method of synchronizing a mobile terminal in a mobile radio network in which synchronization of said mobile terminal takes place only after determination of the best call for communication by means of a measurement campaign, the method comprising the following steps:

requesting synchronization of said mobile terminal in order to communicate with a control station, verifying that a measurement campaign has already been effected, verifying that the time elapsed since said measurement campaign was effected is less than a predetermined validity time interval, if so, synchronizing said mobile terminal to said control station, in accordance with the results of the measurement campaign which already has been effected, and, if not, effecting a new measurement campaign and synchronizing said mobile terminal in accordance with the result of the new measurement campaign.

2. Method according to claim 1 wherein the measurement step preceding the synchronization step is carried out only if said time elapsed since said preceding measurement campaign is greater than said validity time interval.

3. Synchronization method according to claim 1 wherein said time interval is determined dynamically by an algorithm allowing for the conditions of use of said mobile terminal.

4. Synchronization method according to claim 1 wherein said synchronization request is made after loss of synchronization of said mobile terminal.

5. Synchronization method according to claim 1 wherein said synchronization request is made after switching on of said mobile terminal.

6. Synchronization method according to claim 1 used in a GSM type mobile radio network.

7. Mobile terminal used in a GSM type mobile radio network comprising control software implementing the synchronization method of claim 6.

* * * * *